Figure 1:
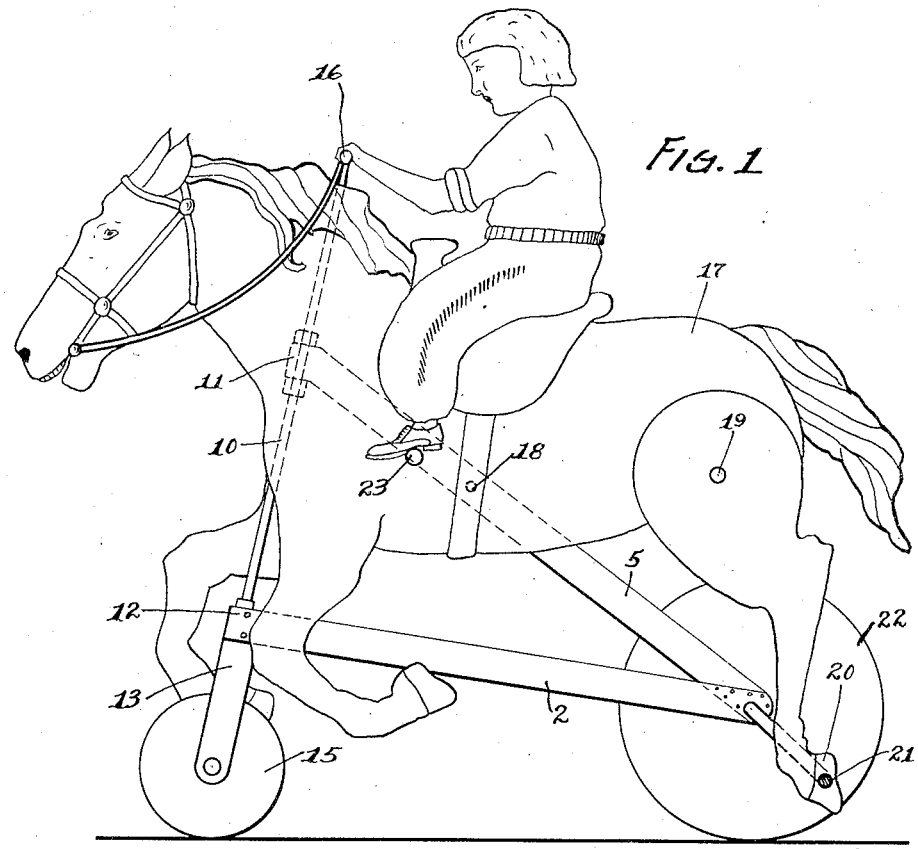

April 7, 1925.

J. R. SIEGER

HOBBYHORSE VELOCIPEDE

Filed June 28, 1923

1,532,204

Inventor

JOHN R SIEGER

By C. D. Enochs

Attorney

Patented Apr. 7, 1925.

1,532,204

UNITED STATES PATENT OFFICE.

JOHN R. SIEGER, OF MINNEAPOLIS, MINNESOTA.

HOBBYHORSE VELOCIPEDE.

Application filed June 28, 1923. Serial No. 648,318.

*To all whom it may concern:*

Be it known that I, JOHN R. SIEGER, a citizen of the United States, and a resident of Minneapolis, in the county of Hennepin and State of Minnesota, have invented certain new and useful Improvements in Hobbyhorse Velocipedes, of which the following is a specification.

One object of my invention is to provide a combination of a crank axle driven truck with a hobby horse so the motion of the truck will cause a motion of the horse simulating running.

Another object is to provide a combination of a hobby-horse and truck of such construction that the truck can be driven by the arm and body motion of a rider sitting on the horse.

Another object is to provide an improved form of construction of three-wheeled truck.

With these and incidental objects in view, the invention consists of certain novel features of construction and combination of parts, the essential elements of which are hereinafter described with reference to the drawing which accompanies and forms a part of this specification.

Figure 2:
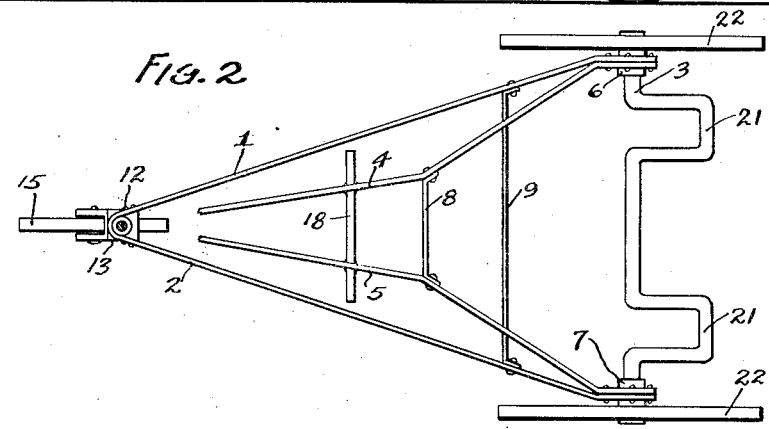

In the drawing, Figure 1 is a side elevation showing my invention but with a rear wheel and part of the framework removed; Figure 2 is a plan view of the truck with a small portion of the upper section removed to better show the construction.

As shown in the drawing, the frame consists of lower members 1 and 2, in which the crank axle 3 is journalled. The upper frame bars 4 and 5 are riveted to the bars 1 and 2 and likewise serve to journal the crank axle 3. Set collars 6 and 7 on the axle 3 position the axle in the frame and braces 8 and 9 on the upper and lower framework, respectively, stiffen the triangular framework.

The steering post 10 is journalled in the upper framework at 11 and in the lower framework at 12, suitable set collars being provided on the steering post. At its lower end the steering post is rigidly attached to the fork 13 in which the steering wheel 15 is journalled. A steering handle 16, carried by the upper end of the post, allows the wheel 15 to be steered at will.

The hobby-horse 17 is hollowed out to receive the framework and is hinged at 18 to the upper frame bars 4 and 5 and the rear legs are hinged to the body at 19. The rear hoofs 20 of the horse are journalled to the cranks 21.

Inasmuch as the horse's body is hinged to the framework at 18 the rear legs are hinged to the horse's body at 19 and the rear hoofs are hinged to the crank axle which drives the wheels 22, it is evident that if the velocipede truck is moved forwardly the rear hoofs will be raised in the position shown in Figure 1, the hind quarters of the horse will be raised, and the fore quarters lowered, and as the velocipede moves forwardly the horse will be given a galloping motion.

Conversely, it will be seen that if the rider pulls on the steering bar 16 he will press his foot down against the pins 23 in the horse's body and this will rotate the horse's body about the hinged point 18. This will, in the position shown in Figure 1, lift the hind quarters of the horse and the rear legs acting as links will lift the cranks upwardly, thereby rotating the wheels 22 and imparting a forward motion to the velocipede.

When the cranks have reached the highest point and passed over the center, by throwing the weight of his body back on the saddle, which is to the rear of the hinged point 18, the rider will give force to the downward motion of the crank, thereby continuing the forward motion of the velocipede.

It will, therefore, be seen that by a rocking motion of the body, such as one naturally gives in riding a galloping horse, the child rider not only imparts this rocking motion to the hobby-horse, but also drives his velocipede forward.

While I have described my invention and illustrated it in one particular design, I do not wish it to be understood that I limit myself to this construction, as it is evident the application of the invention may be varied in many ways within the scope of the following claims.

Claims:

1. In a hobby-horse velocipede the combination of a three-wheeled truck, means for steering one of the wheels of said truck, a crank axle for driving the other wheels of said truck, a hobby-horse whose body is hinged to a frame member of said truck, and whose hind legs are hinged to its body, and whose rear feet are hinged to the cranks of said axle, and a driver's seat mounted on said hobby-horse.

2. In a hobby-horse velocipede the combination of a three-wheeled truck, means for steering one of said wheels, a crank axle for driving the other wheels, a hobby-horse hinged to a frame member of said truck, a driver's seat mounted on said hobby-horse, and means whereby a rocking motion of said horse will propel said truck.

3. In a hobby-horse velocipede the combination with a lower triangular frame of an upper triangular frame, the rear end of which is joined to the rear end of said lower frame, a crank axle journalled in said frames where they join, a steering post hinged in the forward end of each of said frames, a hobby-horse hinged to the upper of said frames, the rear legs of said hobby-horse being hinged to said crank axle whereby the rocking motion of said horse will rotate said crank axle.

4. In a hobby-horse velocipede the combination with a wheeled truck of a hobby-horse pivotally mounted on said truck, the rear legs of said hobby-horse being pivotally mounted to the body thereof and forming means connecting said hobby-horse with a crank axle of said truck for driving the same, a support for a rider's foot carried by said horse forwardly of its hinged point, and a driver's seat rearward of said hinged point.

JOHN R. SIEGER.